Patented Sept. 9, 1947

2,427,238

UNITED STATES PATENT OFFICE 2,427,238

CARBON BLACK PELLETS

Gilbert Holm Swart, Akron, Ohio, assignor to The General Tire & Rubber Company, Akron, Ohio, a corporation of Ohio No Drawing. Application April 27, 1944, Serial No. 533,099

6 Claims. (Cl. 106—307)

This invention relates to carbon black compositions and particularly to carbon black compositions which are more readily dispersed in rubberlike materials and to methods of making the same.

In the compounding of rubber-like materials, particularly rubberlike materials including natural rubber and polymers and copolymers of materials containing a substantial proportion of butadiene, homologues and analogues thereof, it is desirable to disperse within the rubbery material large proportions of carbon black. Usually this is done by masticating the rubber and carbon black on a mill or in a Banbury mixer until the agglomerates of carbon are broken up to a substantial extent. While some of the carbon black appears to be dispersed in the rubber with relatively little mastication, a considerable proportion generally requires a relatively long period of mastication and some particles of carbon may never be dispersed the desired extent.

It is an object of the present invention to provide carbon black or other finely divided carbon that is more readily dispersed in rubberlike materials than the carbon black heretofore produced.

It is another object to provide a method of treating carbon black to increase its dispersibility.

It is a further object to decrease the amount of mastication required for the production of rubber mixes having carbon black dispersed therein and to produce rubber carbon black compounds having improved curing properties.

It is found that carbon black, particularly beaded carbon black, which contains a relatively small amount of a lubricant, such as a liquid material having a boiling point above that of water, or a material which is a soft plastic or liquid at a masticating or milling temperature, (temperature below 200° C. or preferably below 180° C.) may be much more readily dispersed into rubber, rubberlike resins or elastomers and the like than is carbon black prepared without such lubricant; it is also found that a superior dispersion is produced.

The liquid lubricant should be distributed throughout the carbon black and is preferably incorporated with the aid of a carrier fluid, such as water, volatile solvent and the like, during the beading process. The liquid or plastic material preferably used depends on the type of rubberlike material into which the black is to be incorporated and upon the particular steps to be utilized in the incorporation. Thus, when the black is to be dispersed in water, e. g. addition to rubber or synthetic rubber latex, it is especially desirable that the liquid material be miscible with water and be a relatively non-volatile or relatively high boiling liquid. It is also desirable, when the black is to be incorporated in a latex that is to be thereafter coagulated and masticated, that the liquid be or have at least one constituent which is transformed by coagulants into a water insoluble material that is liquid or plastic at masticating temperatures.

The preferred liquid materials for incorporation in black intended for admixtures in aqueous materials or latices are hygroscopic organic liquids and solutions of hygroscopic or deliquescent substances which are capable of absorbing or retaining moisture from the atmosphere and elsewhere to produce a liquid of higher boiling point than the boiling point of water. The combination of such liquids with a water-soluble soap is especially desirable. Examples of hygroscopic liquids or solids which may be used are: glycols or polyhydric alcohols, including ethylene and propylene glycols; glycerol; sorbitol; ethylene glycol monoethyl ether; ethylene glycol monobutyl ether; etc. Deliquescent materials include both organic and inorganic deliquescent materials although inorganic deliquescent materials, such as calcium chloride, zinc chloride, aluminum chloride and the like, are not as desirable as organic materials and may not be used with black intended for some applications. Examples of other water-soluble materials include water-soluble soaps of rosin, pine tar, stearic, oleic and myristic acids, water-dispersible lecithin and the like, as well as the oily wetting agents.

When the carbon black is to be incorporated in a non-hydrocarbon synthetic elastomer which is not compatible with aliphatic materials, oily liquids of the high boiling ester or ether type, such for example as dibutyl phthalate, dicresyl phosphate, tricresyl phosphate, dibutyl sebacate, long-chain polyhydric alcohols (those having four or more carbon atoms, e. g. 2-methyl 2,4 pentanediol), aromatic compounds, and long-chain aliphatic saturated or unsaturated monohydric alcohols, e. g. oleyl or lauryl alcohols, which are liquid at a temperature at which the elastomer is masticated or which have a boiling point higher than that of water. In the case of organic compounds which are not miscible with water and which do no facilitate the retention of moisture, it is preferable that a hydrated drying agent, e. g. magnesium oxide, barium oxide or hydroxide, fine alumina, alum, etc. (or agent which when dried at high temperature becomes a desiccant), be utilized in conjunction with the organic liquid to retain water for assisting in the curing of the rubberlike material.

In accordance with the present invention, the organic liquid is incorporated into the black with the aid of a carrier liquid, such for example as water or volatile solvent. In the case of materials which are miscible or soluble in water, e. g. hygroscopic organic liquids and deliquescent inorganic solids, etc. mentioned above, the material is preferably dissolved in water and incorporated in the black. The amount of water used for the incorporation of the liquid should usually be sufficient to wet or pellet the black so that uniform distribution of a relatively high boiling material may be obtained throughout the mix. In the case of water-insoluble or water-immiscible liquid materials, such as rubber softeners, rubber solvents, and solids meltable at masticating temperature, the addition to the black is preferably made by forming an aqueous emulsion or dispersion of the materials alone or of a solution thereof in solvent, which is diluted with sufficient water to wet the black, and incorporated therewith. The aqueous solution containing one or more of the above liquids is preferably added during the pelleting process as a substitute for the pelleting liquid or a portion thereof usually used. The thus wetted or moistened black is subsequently heated to drive off the major portion of the water.

If the liquid used is not a softener or solvent for the rubber, the amount preferably used is relatively low, such as up to 5% or so of the carbon black. In the case of hygroscopic liquids or deliquescent solids, the preferred amount used is that which will retain about 1% to 8% of the liquid, including moisture, based on the weight of the carbon black. When the total weight of the material including the moisture amounts to about 3% to about 5% of the weight of the carbon black, the dispersing qualities of the black are especially desirable. In case the liquid used is a softener or solvent for the rubber for which the black is intended, more of the liquid, say up to 30% of the weight of the black, may be desirable, although amounts corresponding to the amounts of hygroscopic liquid are effective. As little as .1% of the liquid material is noticeably effective in improving dispersion, but substantial improvement is had when the quantity of the liquid material is increased to above 1% of the weight of the carbon black.

The hygroscopic, deliquescent or water soluble materials of the present invention tend to increase the moisture content of the carbon black even though the black is subjected to a low temperature drying treatment after the incorporation of the material. Thus, when the materials are added in the pelleting process by mixing with the pelleting solution, and the black thereafter subjected to a heating step to drive off moisture, the presence of the moisture-retaining material or relatively high boiling liquid either decreases the amount of water lost or causes increased absorption of water during subsequent warehousing of the treated black, so that when the black is used for mixing with rubberlike materials, the added liquid or moisture content is substantially increased and dispersion is improved.

The temperature at which the treated carbon (carbon plus carrier fluid containing higher boiling liquid) is dried should be above the boiling point of water and below the boiling point of the liquid, or if a higher temperature is used its duration should be insufficient to cause vaporization and loss of the higher boiling material. Since in the case of deliquescent and hydroscopic materials the boiling point of aqueous mixtures thereof increases with loss of water, it is preferred to regulate the moisture content of the black by regulating the drying temperature so that it corresponds to the boiling point of the desired aqueous solution of hygroscopic or deliquescent material.

The following examples illustrate the present invention:

Example 1

100 parts of carbon black are slowly treated in a suitable pelleting unit with 80 parts of an aqueous solution containing 2 parts of glycerine to produce pellets having the black bound together with the aqueous glycerine solution. The pellets thus obtained are passed through a heated zone, about 105° C., to drive off the excess water. The black composition thus obtained, containing about 2 parts of moisture and about 2 parts of glycerol may be dispersed in natural rubber or rubberlike materials, including Buna rubbers such as Buna-S, Buna-N, and methylmethacrylate-butadiene copolymers, butyl rubber, etc., more readily than pellets of the same black but which do not contain the organic liquid or moisture.

Example 2

.2 part of calcium chloride was substituted for the glycerine of Example 1, the treatment otherwise remaining the same. When about 45 parts of the carbon black composition thus produced was masticated into Buna-S rubber, a good dispersion having a substantial absence of crock was produced with a relatively small amount of mastication.

Example 3

100 parts of carbon black are treated in a suitable pelleting unit with about 120 parts of an aqueous solution of a sodium soap, which is prepared by reacting 10 parts of a viscous rosin-terpene mix widely used as a rubber softener with aqueous sodium hydroxide. The soft pellets thus obtained are passed through a heating zone of about 140° C. to remove the major portion of the water. The black thus obtained, particularly after treatment with saturated steam, is readily wetted by water to produce a fluent mixture. When the black is incorporated in a rubber latex and the latex subsequently coagulated by acid, zinc chloride or the like, the black in the rubberlike material thus obtained is readily dispersed by only slight mastication. The rosin or zinc rosinate formed by the reaction of the coagulum with the soap serves as a softener for the rubbery mass.

It is often desirable to utilize a water-soluble soap as an emulsifying agent for preparing an aqueous emulsion of rubber softener, plasticizing agent or other water-immiscible lubricant. When such an emulsion is substituted for the water-soluble soap solution in the above example, the entire softener becomes substantially uniformly distributed throughout the rubbery mass.

Pelleted carbon black such as that produced in Example 1, which contains a water-soluble liquid, a soap or the like, is especially desirable for addition to aqueous rubber latex as upon contact with the water the pellets are much more easily broken down than are pellets which do not contain a water-soluble material.

When the carbon black is to be incorporated in an aqueous dispersion of a rubberlike material or an elastomer, it is especially desirable that the organic liquid be combined with a small amount of a wetting or dispersing agent, such as one or more of those selected from Van Antwerpen's list of "Surface-active agents," published in "Industrial and Engineering Chemistry," vol. 33, No. 1, pages 16-22, January 1941, and vol. 35, No. 1, January 1943.

It is often desirable when the carbon black is to be incorporated into latex, to utilize an aqueous solution of a substantial amount of a water-soluble soap, such as sodium rosinate, oleate, stearate and the like, or the sodium salt of a rosin-terpene mixture as the pelleting medium. When the black thus treated is incorporated in the latex the soap functions as a wetting agent to cause break-up of the pellets. Upon coagulation and acidification of the latex-black mix, the soap is transformed into the long-chain acid which is desirable in the rubber mix and which functions upon mastication as an agent which facilitates dispersion.

It will be seen that the carbon black is so treated in the present invention so that the material facilitating dispersion is distributed throughout substantially the entire mass. If the treated carbon black is subjected to a drying treatment prior to use, the drying temperature is usually chosen to be below the boiling point of the liquid materials. Thus, in the case of calcium chloride the drying temperature should be below the boiling point of a concentrated solution of calcium chloride, etc.

The rubber or rubberlike materials used in the above examples may be substituted by other sulfur-vulcanizable rubbers or other materials which may be vulcanized, i. e. treated to effect a transition from a plastic to an elastic state. Examples of such materials include polymers of butadiene, homologues and analogues thereof, including chloroprene, isoprene, dimethyl butadiene, and copolymers of liquids containing one or more such dienes in major proportion with one or more ingredients having a single aliphatic vinyl group, including besides styrene and acrylonitrile the acrylates such as methylacrylate, ethylacrylate, butylacrylate, methacrylates such tas methyl methacrylate, vinyl chloride, vinyl acetate, dimethyl vinyl ethylcarbinol, vinyl pyridine, vinyl ketones, and chlorostyrenes including alphadichlorostyrene, betadichlorostyrene, alpha-betachlorostyrene.

The carbon black compositions may also be dispersed in other vulcanizable or non-vulcanizable rubbery elastomers or synthetic rubbers, including the copolymers of butadiene and isobutylene, condensation polymers such as the Thiokols, etc. and any other rubbery material where it is desired to produce solid mixes having carbon black present in sufficient amounts to modify the characteristics of the rubbery materials other than to merely effect a change in color.

Carbon black is used herein in its generic sense to include types of finely divided carbon such as lamp black, channel black, furnace black, acetylene black and the like.

It is to be understood that variations and modifications of the specific compositions and methods herein shown and described for purposes of illustration, may be made without departing from the spirit of the invention.

What I claim is:

1. Carbon black pellets comprising carbon black, and a relatively small amount of an organic hygroscopic liquid miscible with water, whereby moisture is provided in the carbon black to facilitate dispersion thereof.

2. A method of treating carbon black to improve its dispersibility in rubberlike materials which comprises preparing an aqueous solution of a hygroscopic organic liquid having a boiling point higher than that of water, treating the carbon black with sufficient of said mixture to pelletize the particles thereof, pelletizing the particles thereof, and thereafter heating the mixture to vaporize the water, whereupon the organic liquid remains distributed substantially uniformly throughout said carbon black.

3. A method of treating carbon black to improve its dispersibility in rubberlike materials which comprises preparing an aqueous solution of a lower polyhydric alcohol, treating the carbon black with sufficient of said mixture to pelletize the particles thereof, pelletizing the particles thereof, and thereafter heating the mixture to vaporize the water, whereupon the organic liquid remains distributed substantially uniformly throughout said carbon black.

4. A method of treating carbon black to improve its dispersibility in rubberlike materials which comprises preparing an aqueous solution of a glycerol, treating the carbon black with sufficient of said mixture to pelletize the particles thereof, pelletizing the particles thereof, and thereafter heating the mixture to vaporize the water, whereupon the organic liquid remains distributed substantially uniformly throughout said carbon black.

5. A method of treating carbon black to improve its dispersibility in rubberlike materials which comprises preparing an aqueous solution of a hygroscopic organic liquid having a boiling point higher than that of water, treating the carbon black with sufficient of said mixture to pelletize the particles thereof, pelletizing the particles thereof, and thereafter heating the mixture to vaporize all but about 1% to about 8%, based on the carbon black, of the moisture plus said hygroscopic liquid, whereupon the organic liquid remains distributed substantially uniformly throughout said carbon black.

6. Carbon black pellets comprising carbon black and a relatively small amount of a hygroscopic polyhydric alcohol miscible with water, whereby moisture is provided in the carbon black to facilitate dispersion thereof.

GILBERT HOLM SWART.

REFERENCES CITED

The following references are of record in the file of this patent:

UNITED STATES PATENTS

| Number | Name | Date |
| --- | --- | --- |
| 1,889,429 | Wiegand et al. | Nov. 29, 1932 |
| 2,178,382 | Wiegand | Oct. 31, 1939 |
| 2,350,847 | Vogel | June 6, 1944 |
| 1,263,082 | Lewis | Apr. 16, 1918 |
| 1,651,733 | Sheppard | Dec. 6, 1927 |
| 2,015,234 | Rodman | Sept. 24, 1935 |